(12) United States Patent
Shouse et al.

(10) Patent No.: US 7,654,036 B2
(45) Date of Patent: Feb. 2, 2010

(54) HORTICULTURAL GROWING RACK (75) Inventors: Levi Shouse, San Diego, CA (US);
William Reck, Santee, CA (US)

(73) Assignee: Best Coast Growers, Inc., San Diego, CA (US)

( * ) Notice: Subject to any disclaimer, the term of this patent is extended or adjusted under 35 U.S.C. 154(b) by 347 days.

(21) Appl. No.: 11/428,234

(22) Filed: Jun. 30, 2006

(65) Prior Publication Data

US 2008/0000152 A1 Jan. 3, 2008

(51) Int. Cl.
*A47G 7/02* (2006.01)
(52) U.S. Cl. .......................................................... 47/39
(58) Field of Classification Search ................. 47/59 R, 47/18, 39; 248/161, 407; 108/17, 23, 50; 211/49.1, 60.1, 189; 182/185.1; 403/25, 403/217
See application file for complete search history.

(56) References Cited

U.S. PATENT DOCUMENTS

| 545,438 | A | * | 9/1895 | Allen | 248/407 |
| 1,268,649 | A | * | 6/1918 | Velde | 47/18 |
| 2,438,324 | A | | 3/1948 | Pfeffer | |
| 3,386,590 | A | * | 6/1968 | Gretz | 211/189 |
| 3,537,596 | A | * | 11/1970 | Brunette | 211/186 |
| D237,898 | S | * | 12/1975 | Austin | D11/144 |
| D243,906 | S | * | 4/1977 | Ware | D11/144 |
| D245,681 | S | * | 9/1977 | Farner | D11/144 |
| 4,045,911 | A | * | 9/1977 | Ware | 47/39 |
| 4,167,905 | A | | 9/1979 | Jones et al. | |
| 4,175,354 | A | | 11/1979 | Anderson | |
| 4,255,896 | A | | 3/1981 | Carl | |
| 4,449,842 | A | * | 5/1984 | Reichman, Jr. | 403/25 |
| 4,934,015 | A | * | 6/1990 | Mink | 15/268 |
| 5,617,962 | A | * | 4/1997 | Chen | 211/206 |
| 5,660,637 | A | * | 8/1997 | Dodge | 118/500 |
| 5,779,063 | A | * | 7/1998 | Moran, III | 211/49.1 |
| 6,004,063 | A | * | 12/1999 | Adams, Sr. | 403/205 |
| 6,523,707 | B2 | * | 2/2003 | Liu | 211/206 |
| 6,604,321 | B2 | | 8/2003 | Marchildon | |
| D486,008 | S | * | 2/2004 | Pospisil et al. | D6/411 |
| 6,868,968 | B1 | | 3/2005 | Casanovas | |
| 2008/0000152 | A1 | * | 1/2008 | Shouse et al. | 47/18 |

OTHER PUBLICATIONS

International Search Report/ Written Opinion issued in PCT/US2007/072122 on Aug. 4, 2008.

* cited by examiner

*Primary Examiner*—Francis T Palo
(74) *Attorney, Agent, or Firm*—Procopio, Cory, Hargreaves & Savitch, LLP; Lisel M. Ferguson (57) ABSTRACT The present invention involves a horticultural growing rack used for growing plants. The horticultural growing rack offers a variety of benefits to a plant grower. The horticultural growing rack can be modified to create various sizes of racks. The rack can also hold various attachments such as a light bar, ballast bar, and tray holders. This rack can be easily shipped and stored.

8 Claims, 6 Drawing Sheets

HORTICULTURAL GROWING RACK

BACKGROUND

1. Field of the Invention

The present invention relates generally to a horticultural apparatus used as rack or stand for growing plants, and more particularly designed and configured to be convertible to various sizes and hold light sources or other hanging objects.

2. Related Art

Hydroponics plant growing racks for various types of plants are well known. However, these prior hydroponics growing racks cannot be generally adaptable to various sizes based on the user's need. Prior hydroponics racks are of one stationary size and are not adjustable with just addition of extended 2×4 boards. Prior racks cannot be adjusted to hold a variety of sizes of planting trays or, adjusted to hold pots or function with plants in the earth. Traditional racks are not always free standing with the ability to attach additional racks to increase the holding capacity. Prior racks cannot be dissembled to be easily stored or shipped. Current racks which are the same size as the maximum dimensions of the instant invention must be shipped in containers at least four by eight feet. Further, prior art does not allow for the light sources or other hanging objects to be attached to the rack so that there is no necessity for a free standing light source.

The present invention has recognized these prior art drawbacks, and has provided the below-disclosed solutions to one or more of the prior art deficiencies.

3. Summary

To solve these problems and others, the present invention involves a hydroponics growing rack which can be adjusted to various sizes by just adding longer 2×4's. One rack can be attached to a second rack to further increase the overall size of the growing rack. A ballast attachment can be added to the rack to hold a light source or other hanging objects such as water dispenser, without the need of an independent stand. This rack is composed of multiple independent pieces which easily fit together and can be used with any standard 2×4 boards. As a result of the independent pieces, this rack can be broken down to be shipped and stored in very small spaces. The independent pieces further allow the user to extend the size of the rack by linking in additional extension pieces or incorporating an entire second rack. This invention further overcomes previous prior art problems as it can be manufactured with different types of materials such as aluminum, stainless steel, carbon fiber, or plastic, among other materials, to overcome corrosion or rusting due to the continuous moisture created by plants.

In accordance with the present invention, the hydroponics plant growing rack may utilize a single growing tray or multiple growing trays supported by the frame system and the attached 2×4's. The length of the 2×4's may be changed based on the number of growing trays or the size of the growing trays the user wants to support. The overall length of one rack can be modified each growing season depending on the desired use.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the claims.

The present invention discloses a horticultural growing rack (rack) which can be used to grow various types of plants. This rack can function with growing trays, potted plants or even plants which are planted in the earth. The rack is sold in parts so that it can be easily and cheaply shipped all over the world. The rack is easily assembled and does not require any tools, screws or nails. The person assembling the rack only needs 2×4's of their desired length. The pieces of the rack slide together and fit firmly to create a stable structure. In one embodiment the rack is made of aluminum making it very durable, but also very light. In other embodiments the rack can be manufactures from plastic or other metals. The 2×4 supports slide through the sleeves on the rack. The rack can be fitted with a spreader bar on its top support to hold lights. This spreader bar can be attached to a light rail system so that the lights can be moved over the plants to cast evenly distributed light. The rack can also be fitted with a watering system. The top support bar can also be fitted with a cross hanger, which includes two sleeves with are welded perpendicular to one another. The cross hanger allow two 2×4's in an X formation to be hung off the top support bar. The cross hanger can be used to hold lights, at each of its end, enabling the light to be further dispersed. In one embodiment the rack includes ballast bars at one or both ends. The ballast bars can be used to hold hooks, or other attachments.

Figure 1:
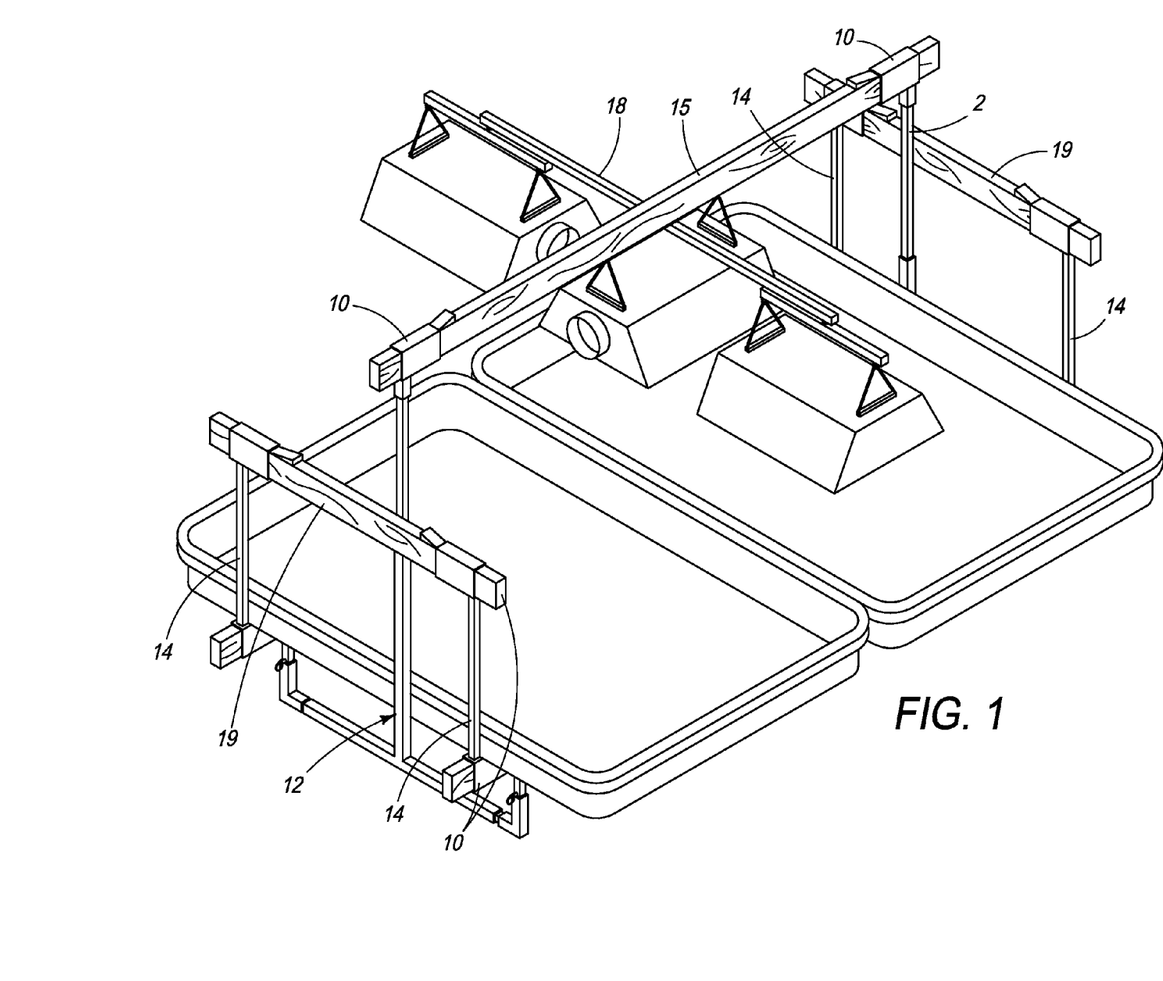
FIG. 1 is a side elevation view of the non-height adjustable hydroponics growing rack supporting two growing trays, a light bar and including an optional ballast bar at each end.

With reference to Figures (FIG.) 1 through 6 a few embodiments of the rack will now be described. FIG. 1 is a side elevation view of one embodiment the hydroponics growing rack supporting two growing trays, a light bar and including an optional ballast bar at each end. The growing rack displayed in FIG. 1 is length adjustable with the 2×4's but is not the height adjustable embodiment. Each end of the growing rack looks like a upside down T 12. The extended bar at the center of the T contains a sleeve 10 at its top end. A 2×4 is slid through the sleeve of each end of the rack to create the upper support bar 15. The rack is fitted with tray holder bars which will be described at FIG. 2. This rack is also fitted with a ballast bar at either end 19. there are four connector pieces 14 used to hold the two ballast bars. Each connector piece is fitted with a sleeve 10 at either end. The sleeves of the ballast bars are welded perpendicular to one another at each end of the ballast bar connector 14. The embodiment in FIG. 1 also displays the optional light bar 18.

Figure 2:
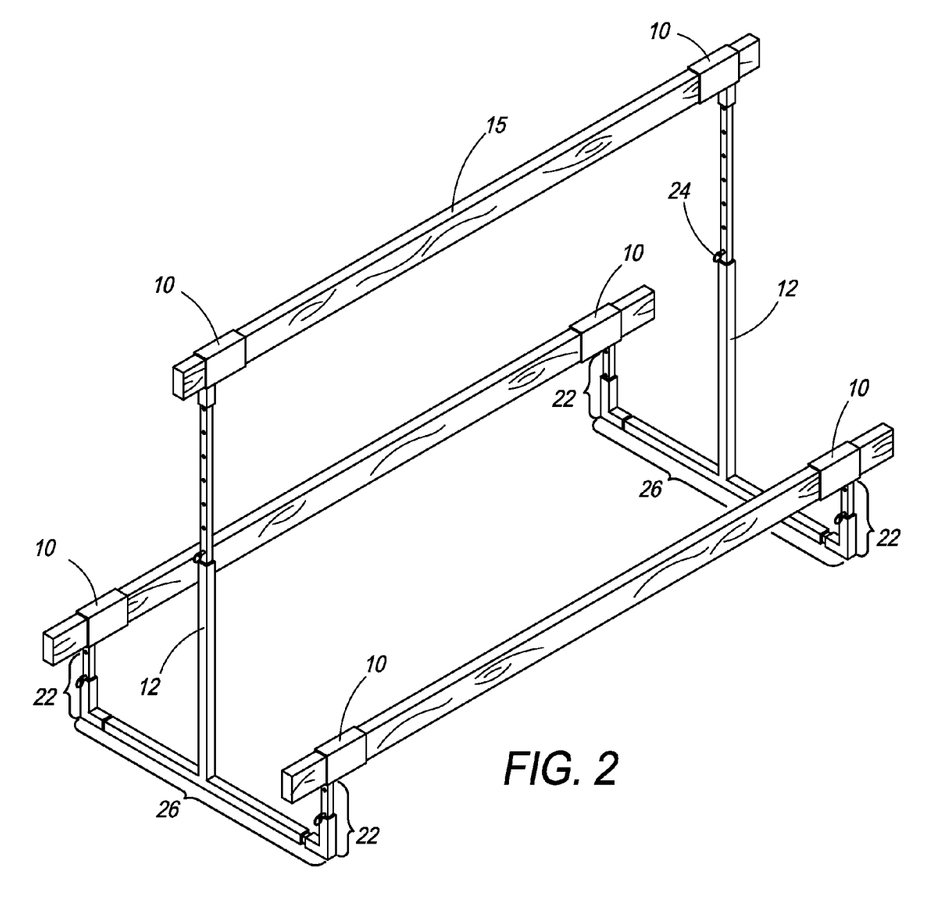
FIG. 2 is a prospective view of the hydroponics growing rack assembled with 2×4's.

FIG. 2 is a prospective view of the hydroponics growing rack assembled with 2×4's, the rack includes a front T component 12 and a back component 12. Each of the front and back components contains a sleeve 10 at the upper end of the center piece. The sleeve is made of a solid rigid material and is sized to snugly fit a 2×4. A 2×4 is slid through the sleeve of each component to create the growing rack top bar 15. The lower end of each the front and back component is T-bar 26 which forms the base of the rack allowing it to sit stable on the ground. In one embodiment either end of the T has an extension piece 22 which extends horizontally and contains a sleeve 10 at its upper end. A 2×4 can be slid through the sleeves on the ends of the T to create a tray holder. A user can adjust the width of the growing rack by inserting various length 2×4's. In a preferred embodiment the length of the 2×4's can range from two to sixteen feet. In the current embodiment, the front and the back component are also height adjustable. The user can slide the bar up or down to the desired height when the desired height is reached a pin 24 is used to hold its position.

Figure 3:
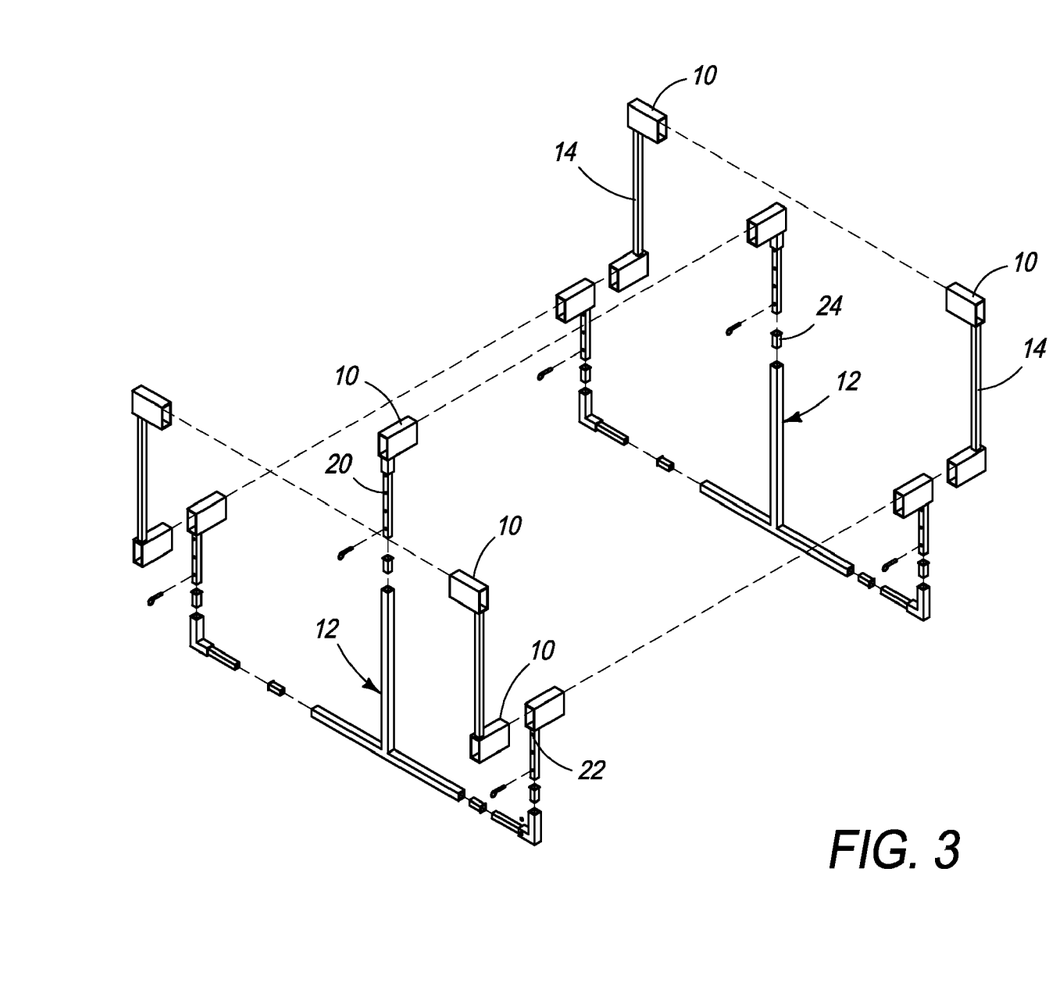
FIG. 3 is an exploded view of the height adjustable hydroponics growing rack dissembled to show the component parts

Referring to FIG. 3, is an exploded view of the height adjustable hydroponics growing rack disassembled to show the component parts. In the embodiment displayed in FIG. 3, the hydroponics growing rack is configured with tray holder pieces 22. At the top of each tray holder piece is a sleeve 10. One 2×4 is used on the left hand side through the two sleeves and a second 2×4 slide on the right hand through the two sleeves. This creates the tray holder at the bottom of the rack. In another embodiment, the tray holder is not present in the rack and the tray extension pieces 22 with the top sleeve 10 at each of the four corners is not present. In the embodiment of the rack which contains the tray holder pieces 22 slide into the ends of the end pieces 12 at the t. The two pieces fit snugly and do not need to be bolted or screwed or nailed together. Each end of the growing rack contains a T bar 12 which sits on its head on the ground or other flat surface. Each end contains a top piece 20 which contains an upper sleeve 10. The top piece 20 slides into the T bar and fits firmly. A 2×4 is slid through the sleeves 10 which now have been connected to the T 12, this 2×4 creates the top bar. Lights or watering systems can be hung from the top bar. The top bar can further be fitted with a spreader bar or a light rail system.

The embodiment displayed in FIG. 3 also includes the attachments for a ballast bar. In the embodiment with the ballast bar, there are four corner attachments 22. Each of these corner attachments 14 are fitted with a sleeve at end 10. The sleeves are welded in perpendicular directions to one another at either end of the ballast bar connector 14. When the ballast bar connector is used with the growing rack, the 2×4 which is used to create the tray holder is slid through the sleeves at the bottom end of the ballast bar connector 14 and at the top end of the rack tray connector 22 at either end of the rack. Two additional 2×4 are used with the ballast rack and are slid through the top sleeve of the ballast connector 14 at the right side and the top of the ballast bar connector at the left side. In the embodiment displayed in FIG. 3, both ends are fitted with ballast bars. In alternative embodiments, there may be just one ballast bar connected at either side of the growing rack.

As can be seen by FIG. 3, the Rack can easily dissembled for storage and shipping and can be easily assembled and expanded in size by adding longer 2×4's or additional connector pieces. The actual end components of the growing rack can also be extended by adding additional lengths of tubular metal or other materials between the t-bar and the corner units.

Figure 4:
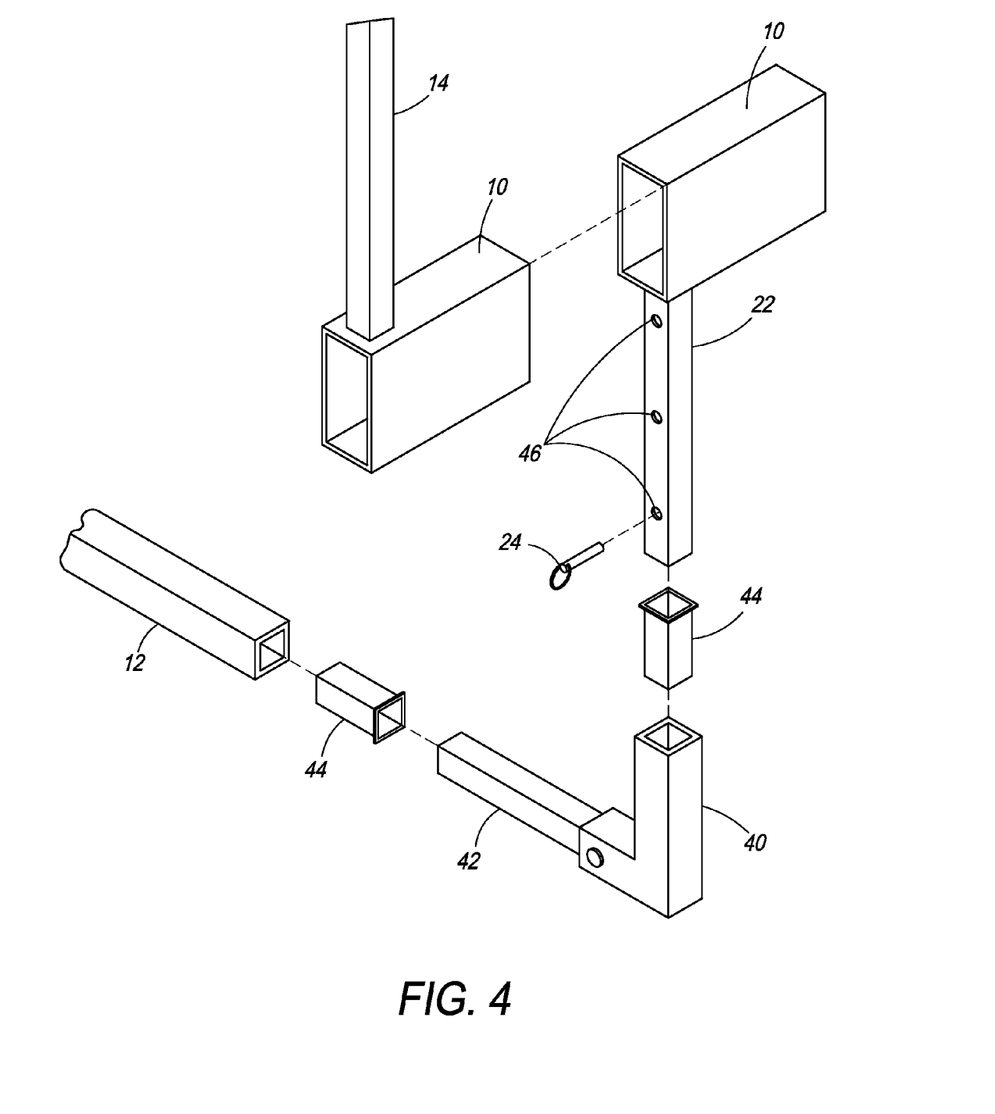
FIG. 4 is an exploded view of one of the four corner components of the height adjustable hydroponics growing rack.

Referring to FIG. 4, is an exploded view of the corner of the T bar the height adjustable rack with a tray rack and a ballast bar attachment. Each corner piece of the rack is comprised of a hollow rectangular portion of aluminum, plastic or other material formed into a "L" shape to form a corner piece 40. One end of the corner piece is welded or otherwise connected perpendicularly to a smaller hollow bar of metal or other substance 42. This corner unit slides into one arm of the T bar through a sleeve device 44. The ballast connector 14 is attached to the other arm of the corner piece through the sleeve at its top end. It has a sleeve 10. The height of the corner can be adjusted by placing a straight pin 24 or other holding device through one of the holes 46 located in the perpendicular bar of the top connector unit.

Figure 5:
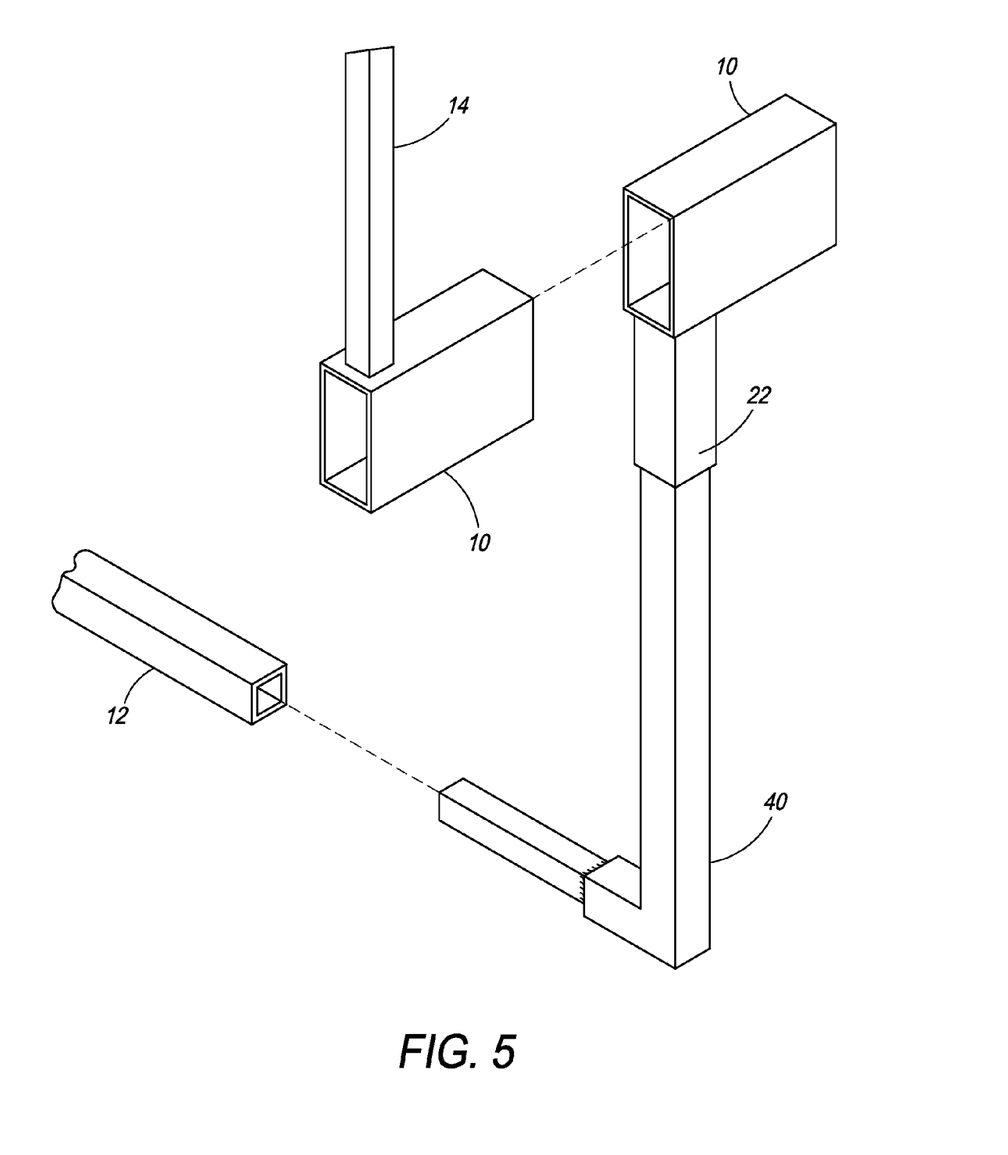
FIG. 5 is an exploded view of one of the four corner components of the non adjustable hydroponics growing rack.

FIG. 5 is an exploded view of the corner of T bar of the non-height adjustable rack with ballast bar attachment. As can be seen in viewing FIG. 5, the tray rack holder 22 has no holes and just slides straight into the corner unit for the two of the T bar. These two pieces fit snugly together to create a rigid connection. There is no sleeve device needed in the non-height adjustable rack.

Figure 6:
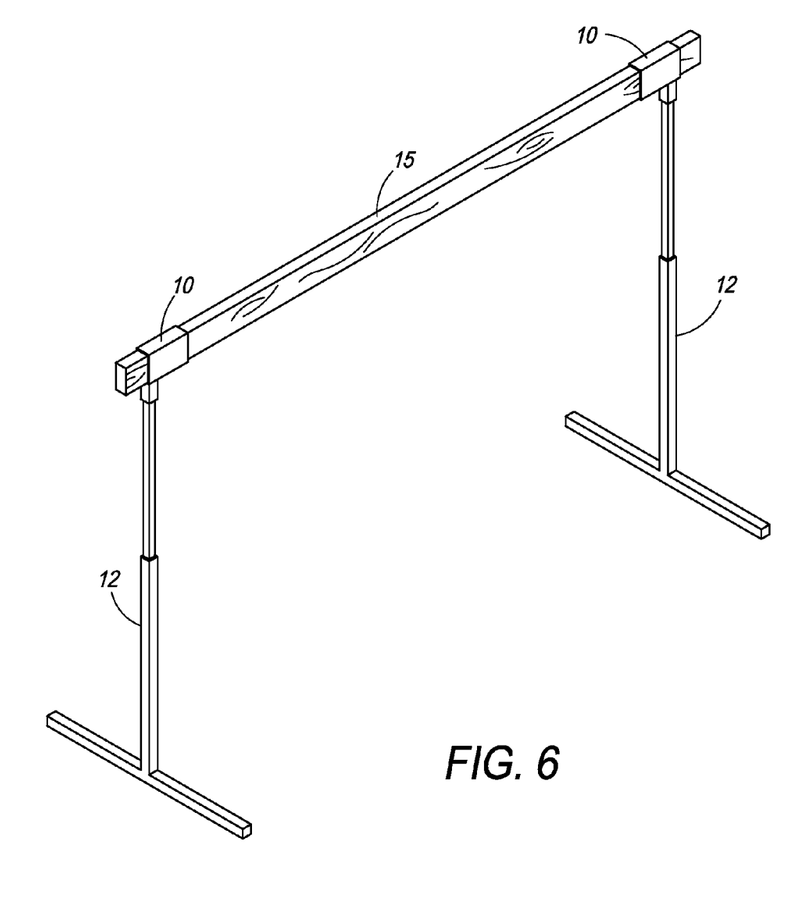
FIG. 6 is a prospective view of an embodiment of the hydroponics growing rack without tray racks.

Referring to FIG. 6 is a perspective of an embodiment of a hydroponics growing rack without tray holders. This basic embodiment of the hydroponics growing rack merely includes a front component T 12 and a back component T 12. Each of the front and the back component contain two pieces. The two piece slide together and upper piece has a sleeve 10 at its end. The 2×4 is slid through the upper sleeves of the two end pieces to create the top bar.

It will be understood that various modifications can be made to the embodiments of the present invention herein described without departing from the spirit thereof. The above description should not be construed as limiting the invention, but merely as exemplifications of preferred embodiments thereof. Those skilled in the art will envision other modifications within the scope and spirit of the present invention.

Various embodiments may also be implemented using a combination of the different materials disclosed.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A horticultural growing rack constructed from a solid rigid material and manufactured in multiple individual pieces which can be connected together, comprising;
   at least two stands each having a T bar where the top end of the T sits on a flat surface with both the right and left side of the top end of the T having extension pieces which rise upward to form tray holders, and the center bar of the T extending upward from the top end of the T to hold a top bar;
   sleeve sections with hollow interiors sized to fit 2×4 boards attachable to the top end of each extension pieces forming the tray holder on either side of the T; and a sleeve section with a hollow interior sized to fit 2×4 boards with a connector piece attachable to the top end of each center bar of each T stand.

2. The rack of claim 1 wherein various lengths of 2×4 boards are slid into the two sleeves to connect the two stands and create a top bar.

3. The rack of claim 2 which is configured to connect to a light bar.

4. The rack of claim 2 which has a light bar connected to the top bar.

5. The rack of claim 1 wherein various lengths of 2×4 boards are slid into the sleeves on either side of the T to form tray holders.

6. The rack of claim 1 constructed with aluminum.

7. The rack of claim 1 wherein each of the two T stands is height adjustable.

8. The rack of claim 1 which has one or more ballast bar connectors which comprise:

a length of square piece of tubular metal; and a sleeve sized to accept a 2×4 board connected at perpendicular angles to one another at either end of the tubular metal.

* * * * *

UNITED STATES PATENT AND TRADEMARK OFFICE
CERTIFICATE OF CORRECTION

| | | |
|---|---|---|
| PATENT NO. | : 7,654,036 B2 | Page 1 of 1 |
| APPLICATION NO. | : 11/428234 | |
| DATED | : February 2, 2010 | |
| INVENTOR(S) | : Shouse et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 564 days.

Signed and Sealed this

Twenty-third Day of November, 2010

David J. Kappos
*Director of the United States Patent and Trademark Office*